(12) United States Patent
Tang et al.

(10) Patent No.: US 6,562,884 B1
(45) Date of Patent: May 13, 2003

(54) EPOXY RESIN COMPOSITIONS HAVING A LONG SHELF LIFE

(75) Inventors: Qian Tang, Oberwil (CH); Gunnar Reitmajer, Freiburg (DE); Martin Roth, Hölstein (CH); Martin Spitzer, Heitersheim (DE); Philip David Willis, Mumpf (CH)

(73) Assignee: Vantico, Inc., Brewster, NY (US)

( * ) Notice: Subject to any disclaimer, the term of this patent is extended or adjusted under 35 U.S.C. 154(b) by 0 days.

(21) Appl. No.: 09/936,710

(22) PCT Filed: Mar. 6, 2000

(86) PCT No.: PCT/EP00/01956

§ 371 (c)(1),
(2), (4) Date: Sep. 14, 2001

(87) PCT Pub. No.: WO00/55234

PCT Pub. Date: Sep. 21, 2000

(30) Foreign Application Priority Data

Mar. 17, 1999 (CH) .................................................. 0498/99

(51) Int. Cl.$^7$ .............................. C08K 3/34; C08L 63/02
(52) U.S. Cl. ........................ 523/443; 523/466; 525/533
(58) Field of Search ................................ 523/443, 466; 525/533

(56) References Cited

U.S. PATENT DOCUMENTS 4,751,256 A * 6/1988 Patel ........................... 523/412
5,994,475 A * 11/1999 Roth ......................... 525/326.7

FOREIGN PATENT DOCUMENTS

| CA | 2209338 | * | 2/1998 |
|---|---|---|---|
| EP | 0 105 488 A2 | | 4/1984 |
| EP | 0 114 478 A1 | | 8/1984 |
| EP | 0 249 200 A2 | | 12/1987 |
| EP | 0 304 503 A1 | | 3/1989 |
| EP | 0 633 286 A1 | | 1/1995 |
| EP | 0 816 393 A2 | | 1/1998 |
| JP | 0002191624 AA | | 7/1990 |

* cited by examiner

Primary Examiner—Robert Dawson
Assistant Examiner—D. Aylward
(74) Attorney, Agent, or Firm—Proskauer Rose LLP

(57) ABSTRACT

A composition comprising
(a) an epoxy resin having, on average, more than one 1,2-epoxy group per molecule,
(b) a polyol as epoxy resin curing agent and
(c) a solid microgel-amine adduct as accelerator has high latency, good storage stability and a wide processing window.

15 Claims, 5 Drawing Sheets

EPOXY RESIN COMPOSITIONS HAVING A LONG SHELF LIFE

The present invention relates to compositions comprising an epoxy resin and, as curing agent for the epoxy resin, a polyol and, as accelerator, a microgel-amine salt or microgel-imidazole salt, and also to crosslinked products obtainable by curing such compositions.

Nitrogen-containing bases are well known to the person skilled in the art as curing agents or curing accelerators for epoxy resins. Such systems have, however, only limited storage stability because those bases react with epoxides even at relatively low temperature, in some cases even at room temperature, which is manifested in an increase in the viscosity of the epoxy resin formulation and, on prolonged storage, results in gelation of the mixture. The greater the reactivity of the nitrogen-containing base, the lower the storage stability of the epoxy resin mixture and the shorter the pot life. For that reason, such systems are formulated as two-component systems, that is to say the epoxy resin and the nitrogen-containing base are stored separately and mixed only shortly before processing.

There has been no shortage of attempts at improving the storage stability of such systems by developing appropriate curing systems. The problem posed is the more complex because, at the same time as the requirement for a high storage stability and a long pot life, there should not be any deterioration either in the reactivity at the desired curing temperature or in the properties of the fully cured materials.

EP-A-304 503 describes masterbatches of encapsulated materials and epoxides as latent curing agents for epoxy resins, wherein the core material is a tertiary amine in powder form, which is surrounded by a shell of the reaction product of the same amine with an epoxy resin.

A similar curing system, but with a core material of an amine and an anhydride, is disclosed in JP-A-Hei 02-191624.

Although such latent curing agents and accelerators based on encapsulated particles are suitable for producing storage-stable one-component systems, they have the disadvantage of inadequate stability with respect to mechanical influences, such as shear forces and compressive loads.

$BCl_3$ complexes also have good latency, but fumes are formed at temperatures above 160° C., prohibiting their use in epoxy-resin-based casting resins because the mould temperatures are at or above that temperature.

EP-A 0 816 393 describes latent epoxide curing systems (based on anhydride curing agents in combination with salts of COOH-group-containing microgels and nitrogen bases) having an improved pot life, which have high stability with respect to mechanical stress in the form of shear forces and, in addition, result in cured mouldings that have a high glass transition temperature and a high thermal stability. The latency of those systems is, however, capable of further improvement, especially at elevated temperatures.

EP-A 0 633 286 describes curable epoxide curing systems for the production of moulded articles having high-gloss surfaces, comprising an epoxy resin, a curing agent and, as fillers, wollastonite and a quartz/kaolinite mixture. The latency of such systems is, however, like-wise capable of further improvement.

The aim of the present invention was to make available epoxide curing systems having good storage stability, good reactivity under curing conditions, good and at the same time highly varied processing possibilities, even at elevated temperatures, and, finally, good properties of the fully cured materials.

It has now been found that compositions comprising an epoxy resin and, as curing agent for the epoxy resin, a polyol and, as accelerator, a solid microgel-amine salt or a solid microgel-imidazole salt have the desired property profile.

The present invention accordingly relates to a composition comprising (a) an epoxy resin having, on average, more than one 1,2-epoxy group per molecule, (b) a polyol as epoxy resin curing agent and (c) a solid reaction product of a carboxylic-acid-group-containing microgel and a nitrogen-containing base (microgel-amine adduct) as accelerator.

Figure 1:
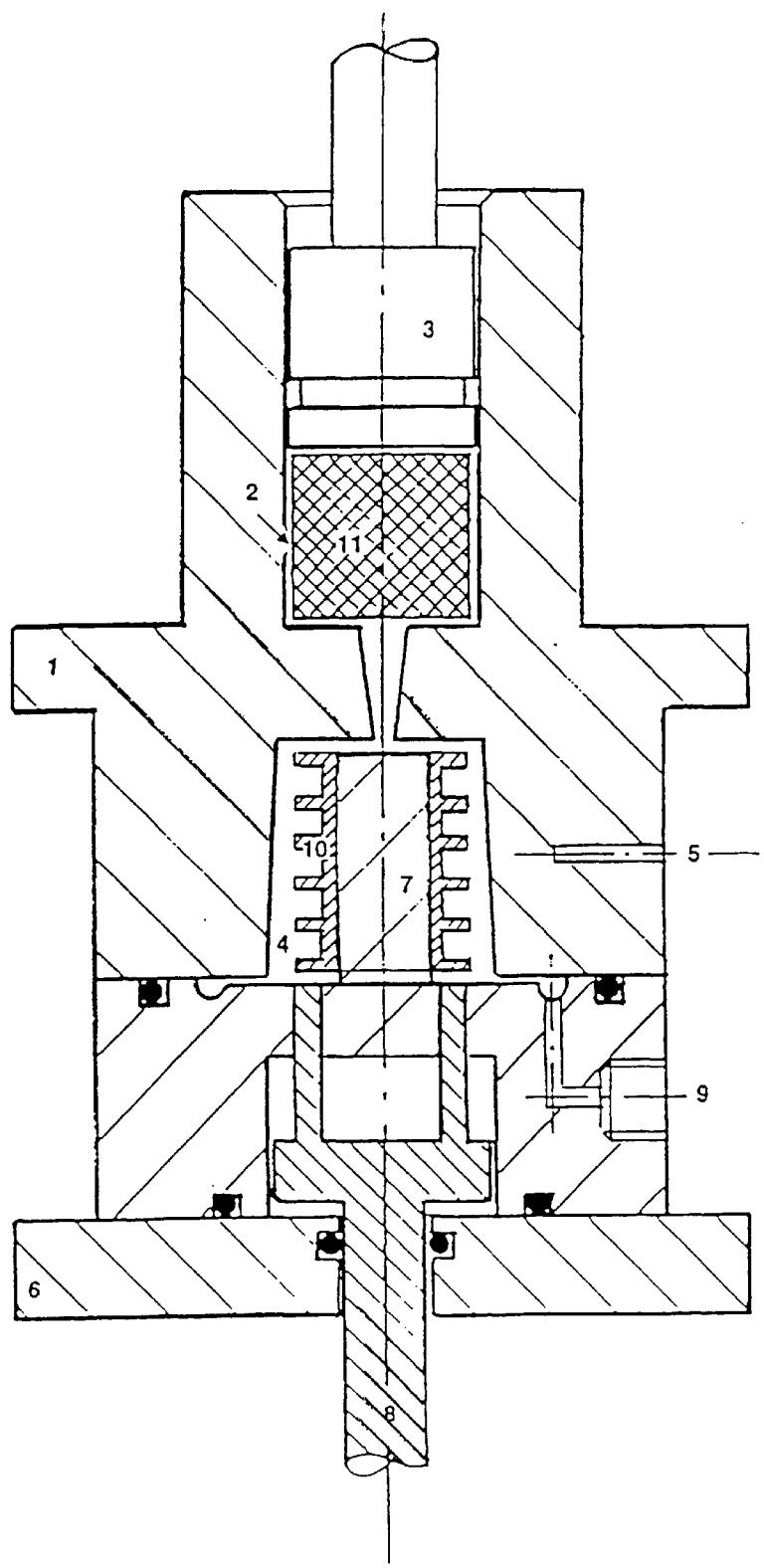
FIG. 1 shows a diagrammatic view of a compression tool.

For the preparation of the compositions according to the invention, epoxy resins suitable as component (a) are those customary in epoxy resin technology. Examples of epoxy resins are:

I) Polyglycidyl and poly(β-methylglycidyl) esters, obtainable by reaction of a compound having at least two carboxyl groups in the molecule with epichlorohydrin and β-methylepichlorohydrin, respectively. The reaction is advantageously performed in the presence of bases.

Aliphatic polycarboxylic acids may be used as the compound having at least two carboxyl groups in the molecule. Examples of such polycarboxylic acids are oxalic acid, succinic acid, glutaric acid, adipic acid, pimelic acid, suberic acid, azelaic acid or dimerised or trimerised linoleic acid.

It is also possible, however, to use cycloaliphatic polycarboxylic acids, for example tetrahydrophthalic acid, 4-methyltetrahydrophthalic acid, hexahydrophthalic acid or 4-methylhexahydrophthalic acid.

Aromatic polycarboxylic acids, for example phthalic acid, isophthalic acid or terephthalic acid, may also be used.

II) Polyglycidyl or poly(β-methylglycidyl) ethers, obtainable by reaction of a compound having at least two free alcoholic hydroxy groups and/or phenolic hydroxy groups with epichlorohydrin or β-methylepichlorohydrin under alkaline conditions or in the presence of an acid catalyst with subsequent alkali treatment.

The glycidyl ethers of this kind are derived, for example, from acyclic alcohols, e.g. from ethylene glycol, diethylene glycol or higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylol-propane, pentaerythritol, sorbitol, and also from polyepichlorohydrins.

Further glycidyl ethers of this kind are derived from cycloaliphatic alcohols, such as 1,4-cyclohexanedimethanol, bis(4-hydroxycyclohexyl)methane or 2,2-bis(4-hydroxycyclohexyl)-propane, or from alcohols that contain aromatic groups and/or further functional groups, such as N,N-bis(2-hydroxyethyl)aniline or p,p'-bis(2-hydroxyethylamino)diphenylmethane. The glycidyl ethers can also be based on mononuclear phenols, for example resorcinol or hydroquinone, or on polynuclear phenols, for example bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl) propane or 2,2-bis(3,5-dibromo-4-hydroxyphenyl)propane.

Further hydroxy compounds that are suitable for the preparation of glycidyl ethers are novolaks, obtainable by condensation of aldehydes, such as formaldehyde, acetaldehyde, chloral or furfuraldehyde, with phenols or bisphenols that are unsubstituted or substituted by chlorine atoms or by $C_1$–$C_9$alkyl groups, e.g. phenol, 4-chlorophenol, 2-methylphenol or 4-tert-butylphenol.

III) Poly(N-glycidyl) compounds, obtainable by dehydrochlorination of the reaction products of epichlorohydrin with amines containing at least two amine hydrogen atoms. Such amines are, for example, aniline, n-butylamine, bis(4-aminophenyl)methane, m-xylylenediamine or bis(4-methylaminophenyl)methane.

The poly(N-glycidyl) compounds also include, however, triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

IV) Poly(S-glycidyl) compounds, for example di-S-glycidyl derivatives, derived from dithiols, e.g. ethane-1,2-dithiol or bis(4-mercaptomethylphenyl) ether.

V) Cycloaliphatic epoxy resins, e.g. bis(2,3-epoxycyclopentyl) ether, 2,3-epoxycyclopentyl-glycidyl ether, 1,2-bis(2,3-epoxycyclopentyloxy)ethane or 3,4-epoxycyclohexylmethyl 3',4'-epoxycyclohexanecarboxylate.

It is also possible, however, to use epoxy resins wherein the 1,2-epoxy groups are bonded to different hetero atoms or functional groups; such compounds include, for example, the N,N,O-triglycidyl derivative of 4-aminophenol, the glycidyl ether glycidyl ester of salicylic acid, N-glycidyl-N'-(2-glycidyloxypropyl)-5,5-dimethylhydantoin and 2-glycidyloxy-1,3-bis(5,5-dimethyl-1-glycidylhydantoin-3-yl)propane.

In addition to liquid polyglycidyl ether and ester compounds there also come into consideration solid polyglycidyl ether and ester compounds having melting points above room temperature up to about 250° C. The melting points of the solid compounds are preferably in the range from 50 to 150° C. Such solid compounds are known and, in some cases, commercially available. It is also possible to use as solid polyglycidyl ethers and esters the advancement products obtained by pre-lengthening liquid polyglycidyl ethers and esters.

For the preparation of the epoxy resin compositions according to the invention it is preferred to use an aromatic epoxy resin, that is to say an epoxy compound having one or more aromatic rings in the molecule.

For the preparation of the epoxy resin compositions according to the invention, there is especially used a bisphenol diglycidyl ether, optionally pre-lengthened, or an epoxy novolak resin, more especially an epoxy phenol- or epoxy cresol-novolak resin. It is also possible to use mixtures of epoxy resins.

As epoxy resin curing agent (b) for the epoxy resin compositions according to the invention, aliphatic or aromatic polyols are used.

Suitable aliphatic polyols are, for example, ethylene glycol, diethylene glycol and higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol or sorbitol.

Suitable aromatic polyols are, for example, mononuclear phenols, such as resorcinol, hydroquinone and N,N-bis(2-hydroxyethyl)aniline, or polynuclear phenols, such as p,p'-bis(2-hydroxyethylamino)diphenylmethane, bis(4-hydroxyphenyl)methane, 4,4'-dihydroxybiphenyl, bis(4-hydroxyphenyl)sulfone, 1,1,2,2'-tetrakis(4-hydroxyphenyl) ethane, 2,2-bis(4-hydroxyphenyl)propane or 2,2-bis(3,5-dibromo-4-hydroxyphenyl)propane, and novolaks, obtainable by condensation of aldehydes, such as formaldehyde, acetaldehyde, chloral or furfuraldehyde, with phenols, such as phenol, or with phenols substituted in the nucleus by chlorine atoms or by $C_1$–$C_9$alkyl groups, e.g. 4-rhlorophenol, 2-methylphenol or 4-tert-butylphenol, or by condensation with bisphenols, such as those of the kind mentioned above.

Preference is given to the use of a cresol novolak as phenolic curing agent (b).

Mixtures of curing agents can also be used. Furthermore, it is also possible to use mixtures of curing agents in which customary epoxy resin curing agents other than the main curing agents mentioned above are used as co-curing agents, for example anhydride curing agents.

The ratio of curing agent (b) to epoxy resin (a) can vary within wide limits and is dependent upon the content of epoxy groups in (a) and of hydroxyl groups in (b) and upon the desired properties of the curable composition and of the cured product. In general, about from 0.7 to 1.3 mol, preferably from 0.9 to 1.1 mol, of OH groups are used per mol of epoxy groups. It is, however, also possible to use lesser amounts of OH groups, optionally with addition of customary epoxy resin curing agents other than the polyols mentioned above.

As component (c) of the present invention there is used a solid reaction product of a carboxylic-acid-group-containing microgel and a nitrogen-containing base (microgel-amine adduct). Further details relating to the preparation of such a reaction product, possible compositions, preferences, etc. form part of the subject matter of EP-A 0 816 393 mentioned hereinbefore and, where relevant to the subject matter of the present invention, are hereinbelow taken from that publication:

In general terms, microgels are understood to be macromolecules the chain segments of which are crosslinked in the region of the individual coils by way of covalent bridges. Microgels can be prepared by various known polymerisation methods. An advantageous method is emulsion polymerisation of compounds having polymerisable C—C double bonds in the presence of so-called polyfunctional crosslinking agents, for example by the seeding technique. After such polymerisation, the microgel particles are present in the form of an aqueous emulsion or suspension. The further reaction with the nitrogen-containing base can be performed preferably using such an emulsion/suspension. It is, however, also possible first to isolate the microgel in the form of a solid powder, for example by spray-drying or freeze-drying, or to convert the aqueous emulsion into an organic phase by solvent exchange.

Any compound containing at least two polymerisable C—C double bonds can, in principle, be used as the polyfunctional crosslinking agent. In that case, intramolecularly crosslinked copolymers, in general having particle sizes in the nanometre range (about 5–1000 nm), are formed.

A preferred microgel for the preparation of the reaction product is a copolymer of at least one unsaturated carboxylic acid and at least one polyfunctional crosslinking agent.

An especially preferred microgel is a copolymer of at least one unsaturated carboxylic acid, at least one vinyl monomer containing no carboxylic acid groups and at least one poly-functional crosslinking agent.

Any carboxylic acid that contains a polymerisable C—C double bond is, in principle, suitable for the preparation of carboxylic-acid-group-containing microgels.

Preferred unsaturated carboxylic acids are acrylic acid, methacrylic acid, 2-carboxyethyl acrylate, 2-carboxyethyl methacrylate, phthalic acid mono(2-acryloylethyl) ester, phthalic acid mono(2-methacryloylethyl) ester, maleic acid, maleic acid monomethyl ester, maleic acid monoethyl ester, fumaric acid, fumaric acid monomethyl ester, fumaric acid monoethyl ester, itaconic acid, cinnamic acid, crotonic acid, 4-vinylcyclohexanecarboxylic acid, 4-vinylphenylacetic acid and p-vinylbenzoic acid.

Acrylic acid and methacrylic acid are especially preferred.

Any compound containing at least two polymerisable C—C double bonds is, in principle, suitable as the polyfunctional crosslinking agent. Also suitable as polyfunctional crosslinking agents are mixtures of at least two vinyl monomers, e.g. methacrylic acid and glycidyl meth-acrylate, which are able to react with one another by way of additional functional groups during or after the polymerisation reaction.

It is preferred to use as the polyfunctional crosslinking agent a polyfunctional acrylic acid ester or methacrylic acid ester of an aliphatic, cycloaliphatic or aromatic polyol, an addition product of acrylic acid or methacrylic acid and a polyglycidyl compound, an addition product of acrylic acid or methacrylic acid and glycidyl acrylate or glycidyl methacrylate, an acrylic acid alkenyl ester or methacrylic acid alkenyl ester, a dialkenylcyclohexane or a dialkenylbenzene.

Especially preferred polyfunctional crosslinking agents are ethylene glycol diacrylate, ethylene glycol dimethacrylate, propylene glycol diacrylate, propylene glycol dimethacrylate, 1,4-butanediol diacrylate, 1,4-butanediol dimethacrylate, polyethylene glycol diacrylate, polyethylene glycol dimethacrylate, polypropylene glycol diacrylate, polypropylene glycol dimethacrylate, 1,1,1-trimethylolpropane triacrylate, 1,1,1-trimethylolpropane trimethacrylate, bisphenol A diglycidyl ether diacrylate, bisphenol A diglycidyl ether dimethacrylate, acrylic acid allyl ester, methacrylic acid allyl ester, divinylcyclohexane and divinylbenzene.

The monomer mixture used for the preparation of the microgels may comprise one or more vinyl monomer(s) containing no carboxylic acid groups, for example butadiene and butadiene derivatives, acrylonitrile, methacrylonitrile, acrylic acid esters and acrylic acid amides, methacrylic acid esters and methacrylic acid amides, vinyl ethers and vinyl esters, allyl ethers and allyl esters, styrene and styrene derivatives.

Preferred vinyl monomers containing no carboxylic acid groups are alkyl esters, hydroxyalkyl esters and glycidyl esters of unsaturated carboxylic acids and styrene derivatives.

Especially preferred carboxylic-acid-group-free vinyl monomers are methyl acrylate, methyl methacrylate, ethyl acrylate, ethyl methacrylate, 2-hydroxyethyl acrylate, 2-hydroxyethyl methacrylate, butyl acrylate, butyl methacrylate, 2-ethylhexyl acrylate, 2-ethylhexyl methacrylate and styrene.

The reaction product is prepared preferably from a microgel that is a copolymer of from 2 to 70% by weight of at least one unsaturated carboxylic acid, from 0 to 96% by weight of at least one vinyl monomer containing no carboxylic acid groups and from 2 to 70% by weight of at least one polyfunctional crosslinking agent, the sum of the percentage amounts by weight always being 100.

Especially preferred microgels are copolymers of from 5 to 50% by weight, especially from 10 to 40% by weight, of at least one unsaturated carboxylic acid, from 0 to 90% by weight, especially from 30 to 85% by weight, of at least one vinyl monomer containing no carboxylic acid groups and from 5 to 50% by weight, especially from 5 to 30% by weight, of at least one polyfunctional crosslinking agent.

The reaction products are referred to hereinbelow simply as "microgel-amine salts", the term "amine" in this context being understood in the very general sense of "nitrogen-containing base" and not being limited to the meaning of the term "amine" in the stricter sense.

Any basic compound containing at least one basic nitrogen atom is, in principle, a suitable nitrogen-containing base for the preparation of the reaction products. Examples thereof include aliphatic, cycloaliphatic and aromatic amines and saturated and unsaturated N-heterocycles.

Primary, secondary and tertiary amines can be used; it is also possible to use compounds having a plurality of basic nitrogen atoms. Examples thereof include imidazoles, polyamines, such as triethylenetetramine and isophorone diamine, polyaminoamides, such as the reaction products of aliphatic polyamines and dimerised or trimerised fatty acids, as well as polyoxyalkyleneamines, such as Jeffamine® (Texaco).

Preference is given to the use of an amine, a polyamine or an imidazole.

Mixtures of amines and imidazoles are of course also suitable.

Especially preferred nitrogen-containing bases are the amines and imidazoles of formula I, II or III

 (I),

 (II), (III)

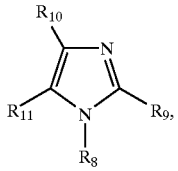

wherein $R_1$ to $R_7$ are each independently of the others hydrogen, $C_1$–$C_{12}$alkyl, unsubstituted or substituted phenyl, benzyl, phenylethyl, cyclopentyl or cyclohexyl, or $R_2$ and $R_3$, or $R_4$ and $R_5$, or $R_6$ and $R_7$, together are tetramethylene, pentamethylene, —(CH$_2$)$_2$—O—(CH$_2$)$_2$— or —(CH$_2$)$_2$—NH—(CH$_2$)$_2$—, A is $C_1$–$C_{30}$alkanediyl, $R_8$ to $R_{11}$ are each independently of the others hydrogen, $C_1$–$C_{18}$alkyl, phenyl or benzyl, or $R_8$ and $R_9$, or $R_8$ and $R_{11}$, or $R_{10}$ and $R_{11}$, together are tetramethylene, pentamethylene, —(CH$_2$)$_2$—O—(CH$_2$)$_2$— or —(CH$_2$)$_2$—NH—(CH$_2$)$_2$—.

Examples of amines of formula I include trimethylamine, triethylamine, phenyidimethylamine, diphenylmethylamine, triphenylamine, benzylamine, N,N-dimethylbenzylamine, pyrrolidine, N-methylpyrrolidine, N-methylpiperidine and N-phenylpiperidine.

Suitable diamines of formula II are, for example, 1,2-diaminoethane and N,N,N',N'-tetramethyl-1,2-diaminoethane.

Examples of imidazoles of formula III include imidazole, 1-methylimidazole, 2-methylimidazole, 2-phenylimidazole, 2-isopropylimidazole, 2-dodecylimidazole, 2-heptadecylimidazole and 2-ethyl-4-methylimidazole.

2-Phenylimidazole, 2-isopropylimidazole, 2-dodecylimidazole, 2-heptadecylimidazole and 2-ethyl-4-methylimidazole are especially preferred nitrogen-containing bases.

The reaction of the nitrogen-containing base with the carboxylic-acid-group-containing microgel is preferably performed in solution. Preferred solvents are water and mixtures of water with water-miscible solvents, for example methanol, ethanol, isopropanol and acetone. The emulsion or suspension obtained on preparation of the microgel by emulsion polymerisation can be used directly in the reaction. The reaction temperatures are advantageously from 0 to 200° C., preferably from 10 to 100° C. The relative proportions of the starting materials can vary within wide limits. Advantageously, however, the carboxylic-acid-group-containing microgel and nitrogen-containing base are used in amounts such that the COOH groups are present in equimolar amounts or in excess relative to basic nitrogen atoms. The number of basic nitrogen atoms is preferably from 5 to 100 mol %, especially from 30 to 100 mol % and more especially from 60 to 95 mol %, based on the number of COOH groups in the microgel.

The microgel-amine salt can be isolated as a solid powder by spray-drying or lyophilisation. It is, however, also possible for the emulsion/suspension to be coagulated using known methods (electrolyte addition, freezing out) and for the precipitated product to be isolated, by filtration, in the form of a solid substance which can optionally be converted into the desired particle size by further pulverisation. The product can also be obtained by evaporating the emulsion to dryness and converting the residue into the desired form by known methods.

For the present invention, the microgel-amine salts are used exclusively in solid form. As mentioned at the beginning, the microgel-amine salts (c) are suitable as curing agents or, especially, as curing accelerators for epoxy resins (a). The relative proportions of components (a) and (c) in the compositions according to the invention can vary within wide limits. The optimum ratio is dependent upon, inter alia, the type of amine and the amine content of the microgel-amine salt and upon the desired reactivity of the composition, and can be readily determined by the person skilled in the art.

The ratio by weight of component (a) to component (c) is advantageously from 1:2 to 2000:1, preferably from 1:1 to 1000:1 and especially from 2:1 to 1000:1, when (c) is used as accelerator.

The compositions according to the invention may optionally comprise further known accelerators, for example imidazoles or benzyldimethylamine.

Furthermore, the curable mixtures may comprise tougheners, for example core/shell polymers or the elastomers or elastomer-containing graft polymers known to the person skilled in the art as rubber tougheners.

Suitable tougheners are described, for example, in EP-A-449 776.

For many applications preference is given to compositions that, in addition to comprising components (a), (b) and (c) described above, also comprise filler (d).

Accordingly, the present invention further relates to curable compositions comprising
(a) an epoxy resin having, on average, more than one 1,2-epoxy group per molecule,
(b) a polyol as epoxy resin curing agent,
(c) a microgel-amine adduct as accelerator, and
(d) filler.

Suitable fillers (d) for the curable mixtures include all known mineral and organic types, for example metal powder, wood flour, carbon black, glass fibres, glass powder, glass beads, Kevlar; semi-metal and metal oxides, such as $SiO_2$ (Aerosils, quartz, quartz powder, fused silica powder, aluminium oxide, titanium oxide and zirconium oxide; metal hydroxides, such as $Mg(OH)_2$, $Al(OH)_3$ and $AlO(OH)$; semi-metal and metal nitrides, for example silicon nitride, boron nitride and aluminium nitride; semi-metal and metal carbides (SiC and boron carbides); metal carbonates (dolomite, chalk, $CaCO_3$); metal sulfates (barytes, gypsum); zinc sulfide; ground minerals, e.g. of hydromagnesite and huntite, and natural or synthetic minerals chiefly of the silicate series, e.g. zeolites (especially molecular sieves), talcum, mica, kaolin, Sillitin, wollastonite, bentonite and others.

In order to improve the mechanical properties and the surface quality it is also possible to use variants of the above-mentioned fillers that are coated with additives, in particular adhesion promoters. For surface treatment, preference is given to the use of silanes and acrylates. An especially preferred variant is silanisation using the epoxy-group-containing silane Silquest® A-187 (gamma-glycidoxypropyltrimethoxysilane from Osi Specialities).

Preferred fillers for the compositions according to the invention are wollastonite and/or a mixture of quartz and kaolinite.

Wollastonite is a naturally occurring calcium silicate of formula $Ca_3[Si_3O_9]$ which has an acicular shape, as does also artificially produced wollastonite. Wollastonite is commercially available, for example under the name Nyad® from the Nico company. It is preferred to use in the compositions according to the invention wollastonite having an average particle size of less than 50 $\mu$m, preferably less than 5 $\mu$m, in amounts of from 1 to 80% by weight, preferably from 25 to 40% by weight, based on the total composition consisting of components (a), (b), (c) and (d).

Quartz/kaolinite mixtures are known and can be produced by simply mixing ground quartz with kaolinite. Kaolinite, a major constituent of kaolin, is commercially available as microcrystalline aluminium silicate.

It is preferred to use in the compositions according to the invention quartz/kaolinite mixtures having an average particle size of less than 50 $\mu$m, preferably less than 5 $\mu$m, and a ratio by weight of quartz to kaolinite of from 5:95 to 95:5, preferably from 20:80 to 80:20, in amounts of from 1 to 80% by weight, preferably from 25 to 40% by weight, based on the total composition consisting of components (a), (b), (c) and (d).

The amounts of fillers can vary within wide limits depending upon the application and are from 1 to 80% by weight, based on the total mixture of components (a), (b), (c) and (d).

In addition to the fillers mentioned above, the curable mixtures may also comprise further customary additives, e.g. solvents, reactive diluents, antioxidants, light stabilisers, plasticisers, dyes, pigments, thixotropic agents, toughness improvers, antifoams, antistatics, adhesion agents, parting agents, hydrophobising agents, lubricants and mould-release agents.

The compositions according to the invention can be produced in accordance with known methods using known mixing apparatus, for example stirrers, kneaders, rollers or dry mixers. In the case of solid epoxy resins, the dispersing can also be carried out in the melt. The temperature during dispersing should be so selected that premature curing does not occur during the mixing process. The optimum curing conditions are dependent upon the microgel, the nature and amount of the nitrogen-containing base, on the epoxy resin and on the form of dispersing and can in each case be determined by the person skilled in the art using known methods.

Component (c), which is present in the form of a solid, is dispersed in the epoxy resin (a) or in a solution of the epoxy resin (a) using known methods, for example by simply stirring or by stirring with the aid of glass beads, the operation advantageously being carried out below the temperature at which the reaction of the microgel-amine salt with the epoxy resin starts. The operation is preferably carried out at temperatures below 60° C.

Component (c) can also be dispersed in the curing agent (b).

The curing of the epoxy resin compositions according to the invention to form mouldings, coatings or the like is carried out in a manner customary in epoxy resin technology, for example as described in "Handbook of Epoxy Resins", 1967, by H. Lee and K. Neville.

Because of the high latency of the microgel-amine salts according to the invention, the curable compositions have high storage stability and a long pot life, and also a high degree of stability with respect to strong mechanical influences (shear loads, compressive loads). The improved storage stability compared with conventional accelerators makes it possible, for example, to prepare one-component epoxy resin/curing agent systems or epoxy resin systems that have improved storage stability without cooling and/or that allow plasticising at relatively high temperatures without the reaction progressing significantly. Such compositions according to the invention remain flowable for longer, for example during plasticising processes, with only slight effects on the reactivity at curing temperature.

The compositions according to the invention are, in principle, suitable for any area of application in which epoxy resins are cured using polyols, for example as casting resins, laminating resins, adhesives, compression moulding compounds, coating compositions, encapsulating systems or as a replacement for ceramics, these being, for example: the encapsulation and impregnation of electrical components, such as coils, switches, relays, transformers, bushings, printer magnets, sensors, stators and rotors, and also for the manufacture of various mechanical components, such as housings, headlights, commutators, pumps and valve parts, pressurised housings, flanges, operating levers and insulators.

The present invention accordingly relates also to the crosslinked products, for example moulded articles, coatings or adhesive bondings, obtainable by curing a composition according to the invention.

EXAMPLES

1. Preparation of Carboxylic-acid-group-containing Microgels

Example 1.1

Microgel of Methacrylic Acid, Methyl Methacrylate, Ethylene Glycol Dimethacrylate and Trimethylolpropane Trimethacrylate First, a monomer mixture of 17.05 g of methacrylic acid, 42.07 g of methyl methacrylate, 7.51 g of ethylene glycol dimethacrylate and 7.51 g of trimethylolpropane trimethacrylate is prepared.

In a sulfonating flask equipped with a glass anchor stirrer, thermometer, gas connection and feed connection, 2.25 g of sodium dodecylsulfate and 422.3 g of deionised water are stirred (about 200 rev/min) under nitrogen and heated to 65° C. (internal temperature). Then 7.4 ml of the monomer mixture described above and a solution of 0.033 g of sodium persulfate in 0.6 ml of deionised water are added. The mixture so obtained is heated to 65° C. and, after stirring for 15 mins. at 65° C., the remainder of the monomer mixture is added over the course of about 1 hour. After stirring at 65° C. for a further 75 minutes, a solution of 0.033 g of sodium persulfate in 0.6 ml of deionised water is added. The reaction mixture is stirred at 65° C. for a further 5.5 hours. After cooling to room temperature, the contents of the reaction vessel are filtered through a paper filter. The emulsion so obtained has a solids content of 14.3% and an acid content of 0.408 mol/kg and can be directly reacted with an amine or imidazole to form a microgel-amine salt.

2. Preparation of Microgel-amine Salts

Example 2.1

A solution of 17.08 g of 2-ethyl-4-methylimidazole in 44 g of isopropanol is added, with stirring, to 400 g of the aqueous emulsion prepared according to Example 1.1. The resulting emulsion of a microgel-imidazole salt is spray-dried (inlet temperature: 132° C., outlet temperature: 85° C.). The microgel-imidazole powder is further dried for 8 hours at 70° C. in vacuo (20 mbar) and has an amine content of 1.96 mol/kg and an acid content of 2.01 mol/kg.

3. Preparation of a Composition According to the Invention and Comparison Examples Example 3.1 (Example of the Invention)

334.40 g of a solid epoxy cresol novolak resin having an epoxy content of from 4.3 to 4.9 mol/kg; 163.20 g of a cresol novolak having a hydroxyl content of from 8.0 to 9.0 mol/kg, obtainable from Occidental Chem., Belgium, under the trade name Durez® 33009; 21.92 g of microgel-imidazole accelerator according to Example 2.1; 562.08 g of wollastonite having an average particle size of less than 4.5 μm, obtainable from Nyco, USA, under the trade name Nyad® 1250; 488.00 g of a quartz/kaolinite mixture having an average particle size of 1.8 μm, obtainable from Hoffmann & Söhne, Germany, under the trade name Aktisil® EM; 6.40 g of carbon black (Elftex 460); 12.80 g of OP Wax 125 U from Hoechst and 9.60 g of calcium stearate are ground in a ball mill, then compounded on a calender (Schwabenthan) at a temperature of from 100 to 110° C. and ground to form granules.

To determine the viscosity and the curing time under process conditions, 34 g of granules are tested in a measuring kneader (Brabender Plasticorder GU 1315/2 type) at a paddle speed of 30 rpm, the so-called B value (torque in Nm) being used as a measure of the viscosity and the AD value as a measure of the curing time (time in seconds from introduction of the sample to curing).

The granules yield the following values:

|  | 120° C. | 160° C. |
|---|---|---|
| B value | 3.5 Nm | 0.6 Nm |
| AD value | 876 sec | 127 sec |

The ratio between the AD values at 120° C. and 160° C. is 6.9, thereby demonstrating good latency.

From the granules there are produced, on chrome-plated tools, ISO bars (80×10×4 mm) over the course of 4 minutes at 170° C. and Tg plates (60×10×1 mm) over the course of 3 minutes at 170° C.

The following properties of the mouldings obtained were measured:

| flexural strength (ISO 178/93) | 95.9 MPa |
|---|---|
| modulus of elasticity (ISO 178/93) | 13087 MPa |
| impact strength (ISO 179-1eU/93) | 5.4 KJ/m$^2$ |
| glass transition temperature (ISO 6721/94) | 214° C. |

Example 3.2 (Comparison Example)

For comparison with Example 3.1, a standard system is prepared, characterised in that 2-ethylimidazole is used as accelerator instead of the microgel-imidazole accelerator in Example 3.1. Otherwise, the Example has the same composition as in Example 3.1. The granules produced analogously to Example 3.1 have an AD value ratio of 3.4.

Example 3.3 (Comparison Example; Use of an Anhydride Curing Agent)

541.5 g of a solid bisphenol A epoxy resin having an epoxy content of from 1.68 to 1.75 equivalents/kg; 1088.3 g of a solid bisphenol A epoxy resin having an epoxy content of from 1.33 to 1.40 equivalents/kg; 285.0 g of an anhydride curing agent; 102.0 g of microgel-imidazole accelerator according to Example 1.2; 5378.3 g of quartz having an average particle size of less than 7.0 µm, obtainable from Sihelco under the trade name B300; 30.0 g of carbon black (Elftex 460) and 75.0 g of OP Wax 125 U from Hoechst are ground in a ball mill, then compounded on a kneader (Werner—Pfleiderer) at a temperature of up to 90° C. and ground to form granules.

To determine the viscosity and the curing time under process conditions, 34 g of granules are tested in a measuring kneader (Brabender Plasticorder GU 1315/2 type) at a paddle speed of 30 rpm, the so-called B value being used as a measure of the viscosity and the AD value as a measure of the curing time (time in seconds from introduction of the sample to curing).

The granules yield the following values:

|  | 120° C. | 160° C. |
|---|---|---|
| B value | 1.3 Nm | 0.3 Nm |
| AD value | 638 sec | 116 sec |

The ratio between the AD values at 120° C. and 160° C. is 5.5, thereby demonstrating good latency.

Example 3.4 (Comparison Example)

For comparison with Example 3.3, a standard system is produced, characterised in that 2-ethylimidazole is used as accelerator instead of the microgel-imidazole accelerator in Example 3.3. Otherwise, the Example has the same composition as in Example 3.3. The granules produced analogously to Example 3.3 have an AD value ratio of 4.5.

The following Table gives an overview of the compositions and the AD ratios determined in each of tests 3.1 to 3.4:

| test | 3.1 | 3.2 | 3.3 | 3.4 |
|---|---|---|---|---|
| resin | epoxy cresol novolak | epoxy cresol novolak | DGEBA | DGEBA |
| curing agent | cresol novolak | cresol novolak | anhydride | anhydride |
| accelerator | microgel | imidazole | microgel | imidazole |
| AD ratio | 6.9 | 3.4 | 5.5 | 4.5 |

In principle, it is more difficult to establish latent full-curing behaviour in the case of highly functional systems (tests 3.1 and 3.2, "novolak systems") consisting of epoxy novolaks and novolak curing agents than is the case with comparatively less functional systems (tests 3.3 and 3.4, "anhydride systems"), the reason being that, in the case of highly functional systems, there is already significant crosslinking when the reaction has progressed only slightly, whereas in the case of the anhydride systems initially only linear structures are formed. That is documented by the fact that, where the measured AD ratios are used as a measure of the latency, the AD ratio drops from 4.5 to 3.4 (see tests 3.4 and 3.2). The Table also shows that, in the case of an anhydride system, an improved latency behaviour can be achieved by replacing an imidazole with a microgel in accordance with the invention. The AD ratio then improves from 4.5 to 5.5. The novolak/microgel system according to the invention (test 3.1) surprisingly then exhibits significantly more latent behaviour than expected. A person skilled in the art who, for application-related reasons, wishes to use a less latent system has a very wide range of possibilities for producing the system according to the invention by including components such as, for example, those used in the above Comparison Examples according to the properties desired.

Application Examples

4.1 Production of Components by the Injection-moulding Technique, Using the Example of Headlight Reflectors The granules prepared according to the above tests 3.1 (according to the invention) and 3.2 are plasticised in the plasticating cylinder of an injection-moulding machine at elevated temperature, the temperatures for zones 1 and 2 being 75° C. in each case and the temperature for zone 3 being 90° C. Under those conditions, when the system prepared according to 3.2 is used, in the event of interruptions in the cycle of more than as little as 60 seconds the plasticating unit of the injection-moulding system must be run until empty and subsequently restarted. When the system according to the invention is used, production can be continued, without a cleaning step, even after interruptions of up to 5 minutes. In the manufacture of headlight reflectors by the injection-moulding technique, excess injected material and residues remaining after removal from the mould, especially on the highly structured rear wall of the reflector, can make it continually necessary to blow out or clean the mould in a separate operation. Such variations between shots can be better tolerated by a latent material as described in test 3.1, because the reaction progresses only slightly in the plasticating cylinder. Consequently, it is possible for the process to proceed more stably, with less waste.

4.2 Impregnating Moulding Compound Using the Example of the Impregnation of Coils a) Preparation of the Impregnating Compound 464.8 g of wollastonite having an average particle size of less than 2 μm (mesh grade 200, obtainable from Nyco, USA, under the trade name Nyad® 200) and 2.3 g of silane adhesion promoter Silan Silquest® A-187 are ground for 30 minutes using a ball mill.

Then the components 151.4 g of a solid epoxy cresol novolak resin having an epoxy content of from 4.3 to 4.6 mol/kg, 98.5 g of a solid bisphenol A epoxy resin having an epoxy content of from 2.15 to 2.22 mol/kg, 109.1 g of a cresol novolak having a hydroxyl content of from 8.0 to 9.0 mol/kg, obtainable from Occidental Chem., Belgium, under the trade name Durez® 33009, 6.7 g of microgel-imidazole accelerator according to Example 2.1, 0.2 g of carbon black (Elftex 460) and 17.0 g of OP® Wax 125 U from Hoechst are added and ground in the ball mill for 3 hours.

Figure 2:
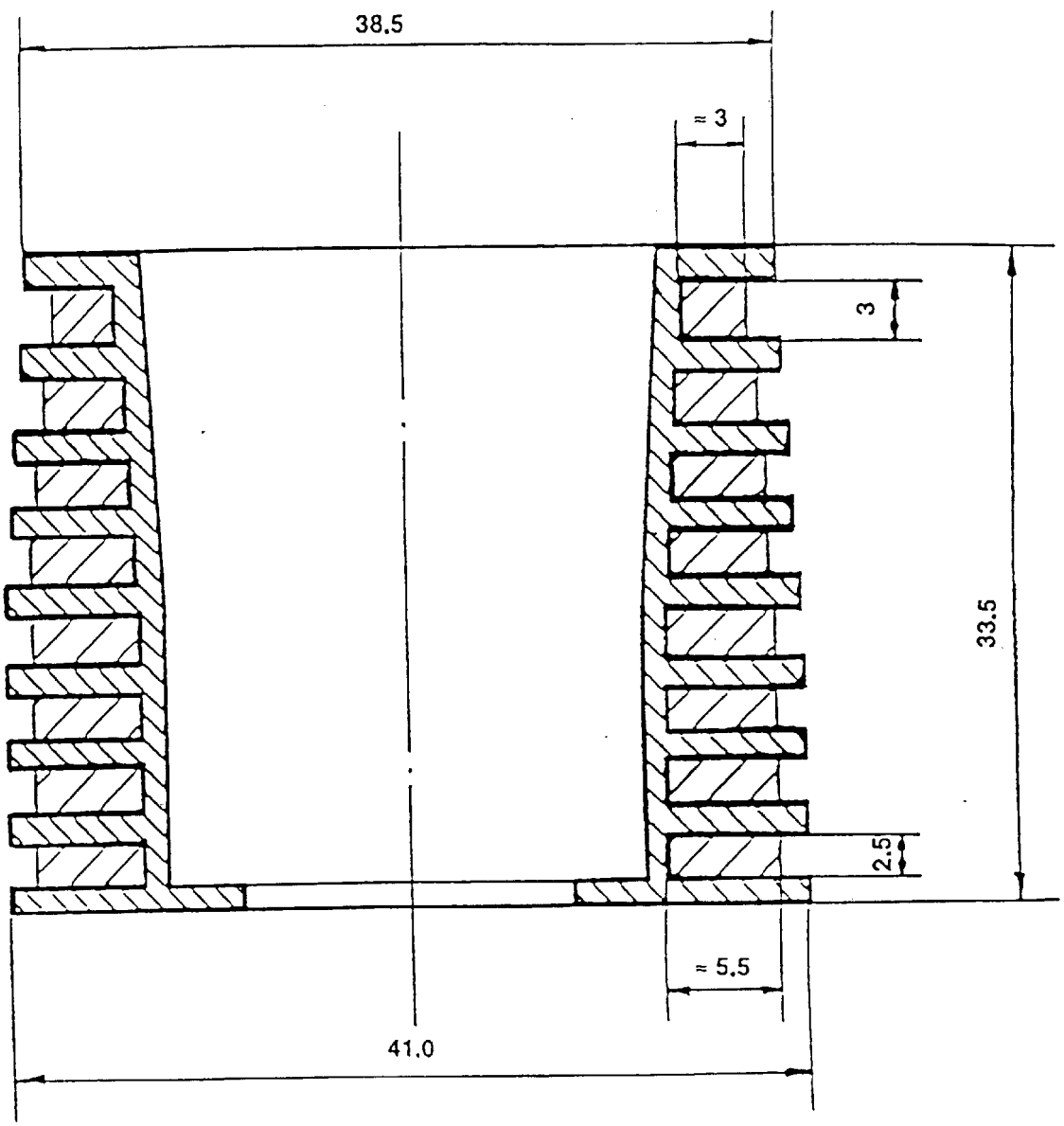
FIG. 2 shows a longitudinal section through the coil former used in the Examples, and its dimensions.

Finally, 150 g of milled glass fibres (average length=225 μm, average diameter=15–16 μm, obtainable under the trade name Milled Glas® from Owens Corning), and the total composition again are ground for 30 minutes. The powders so obtained are then compounded on a calender (Schwabenthan) at a temperature of 80° C. and processed to form granules.

b) Impregnation, Determination of the Depth of Impregnation, Assessment of the Quality of Impregnation FIG. 1 shows a view, in diagrammatic form, of the compression tool by means of which the test coils are impregnated in the following Examples. FIG. 2 shows a longitudinal section through the coil former used in the Examples and its dimensions.

In all the Examples, the impregnation of the test coil is carried out according to the principle of transfer moulding, the test apparatus shown in diagrammatic form in FIG. 1 being used. The apparatus comprises two parts (1) and (6), which are separable from one another. The first part (1) has an injection chamber (2) for accommodating a tablet (11) consisting of the impregnating composition according to the invention; the transfer plunger (3); the cavity (4); and a bore (5) for accommodating a temperature sensor. The second part (6) comprises a core (7) for holding the coil (10) being impregnated, an apparatus (8) for removal of the impregnated coil from the core (7) and a connection (9) for evacuation of the cavity (4). A coil (10) preheated to about 110° C., which has the dimensions shown in FIG. 2 and which has in each compartment a winding of copper wire 94 mm in diameter, having a winding density of about 100 turns per mm$^2$ (the thickness of the winding increasing, from the topmost compartment to the bottommost compartment, from about 3.5 to about 5.5 mm) is introduced into the cavity (4) of the impregnating tool (1, 6), which has been preheated to 180° C. The impregnating composition in the form of granules is cold-compressed into a tablet and then heated to about 70° C. with the aid of a high-frequency preheating apparatus. The tablet (11) so preheated is introduced into the injection chamber (2) and a vacuum of about 30 mbar is applied to the cavity. The impregnating compound is then transferred to the cavity (4) with the aid of the plunger (3) over a period of about 15 s (injection pressure between 80 and 150 bar). The subsequent curing time is 5 min. The encapsulated and impregnated coil is then removed from the mould. The removed coil is sawn apart in the longitudinal direction and polished. With the aid of a microscope, the depth of impregnation achieved in each case is measured and the quality of impregnation is assessed visually, the impregnation being considered "good" if more than 95% of the space between the turns of wire in a winding are filled with the impregnating compound.

In accordance with the described procedure, 500 grams of an impregnating compound of the above composition are prepared and tested. The impregnating compound has the following properties:

| property | |
|---|---|
| depth of impregnation [mm] | 4.0 |
| quality of impregnation | good |
| time to reach Shore-D hardness of 70 | 3 min |

Using the formulation according to the invention, it is consequently possible to achieve an extensive depth of impregnation of 4 mm while achieving a good quality of impregnation. A Shore-D hardness of 70, necessary for removing the coil from the mould, is achieved after only 3 min. A reduction in production costs can be achieved by means of such fast-curing moulding compounds.

4.3 Multi-stage Build-up of a Rod-like Ignition Coil

Industry is calling for ever smaller diameters in the manufacture of rod-like ignition coils. As a result, the encapsulation and impregnation especially of the inner coil in a so-called "one-shot" process is becoming increasingly difficult. That is especially the case because it is imperative to avoid inclusions of air and to obtain an even distribution of the moulding compound.

As a result of the good impregnating properties—described in section 4.2—of the moulding compounds according to the invention, it is possible to build up rod-like ignition coils in several stages.

Figure 3:
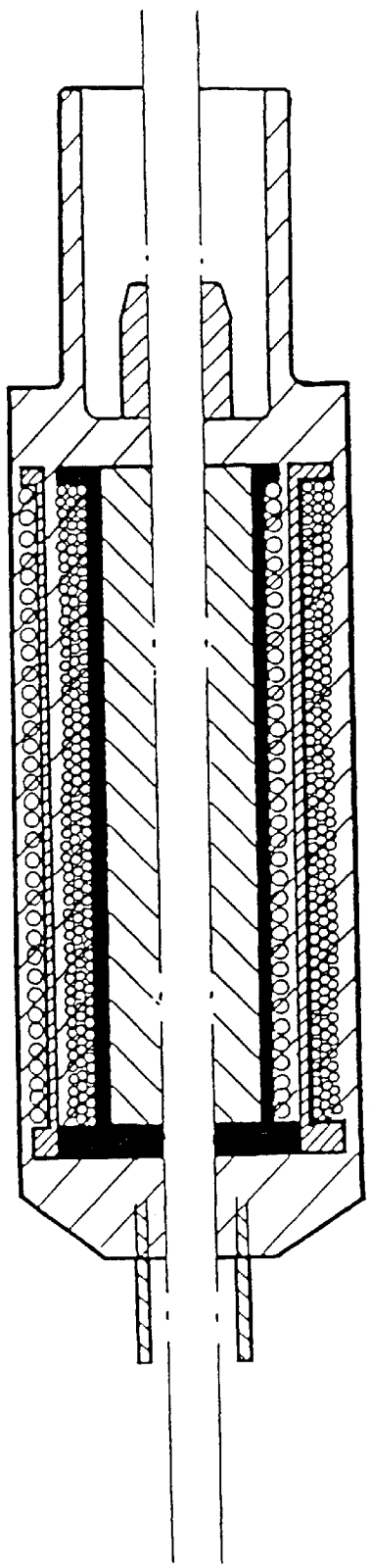
FIG. 3 shows a metal core of a coil encapsulated with the molding compound so that the outer contour forms a coil former for the inner winding of a rod-like ignition coil. The black area corresponds to the molding composition

First the metal core of a coil can be so encapsulated with the moulding compound that the outer contour forms a coil former for the inner winding of a rod-like ignition coil (see FIG. 3; moulding compound corresponds to the black area).

Figure 4:
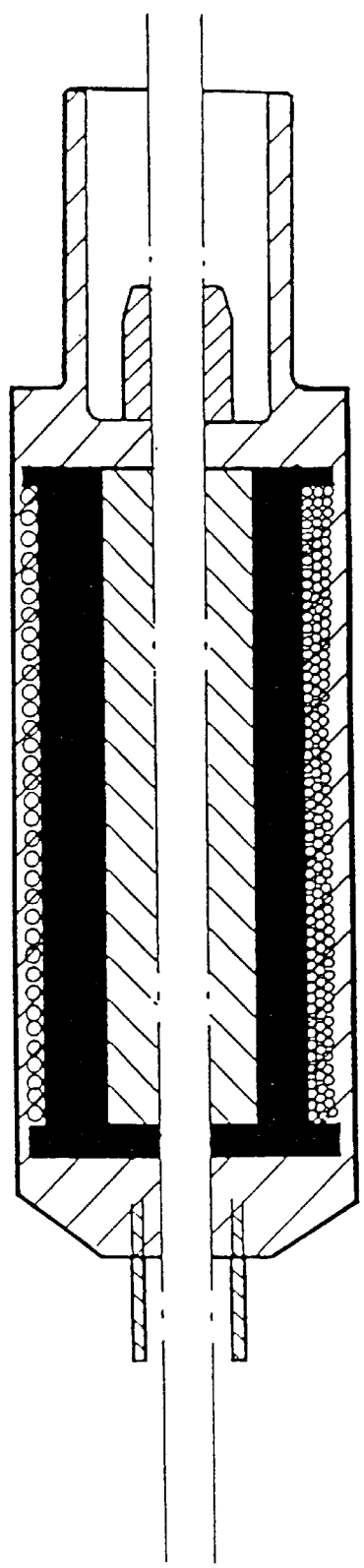
FIG. 4 shows an outer contour of the molding forming a coil former for a second, complementary winding. The black area corresponds to the molding composition.

After the wire winding has been applied, it can be encapsulated, and impregnated, in a second step. The inner coil former can be either the primary or the secondary winding, as indicated in the lower half and upper half of the figure, respectively. The outer contour of the moulding forms the coil former for the second, complementary winding (see FIG. 4; moulding compound corresponds to the black area).

Figure 5:
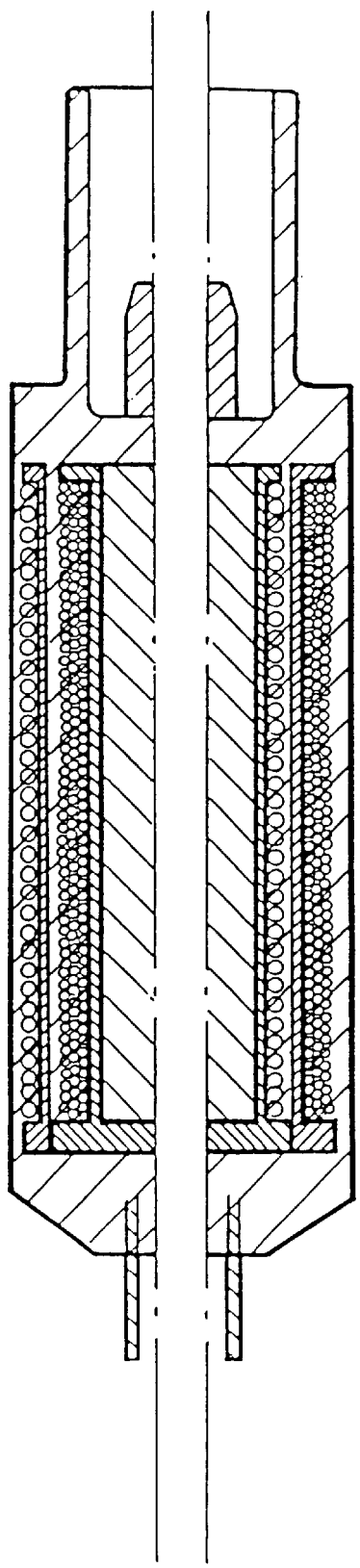
FIG. 5 depicts an outer winding that has been impregnated and encapsulated, and in which the outer shape is identical to the outer contour of the rod-like ignition coil. The molding composition corresponds to the hatched area.

In a third step, the outer winding can then also be impregnated and encapsulated. The outer shape is identical to the outer contour of the rod-like ignition coil, assuming that no further additions (e.g. for electrical screening) are provided (see FIG. 5; moulding compound corresponds to the hatched area).

Industry is calling for ever smaller diameters in the manufacture of rod-like coils. As a result, the encapsulation and impregnation especially of the inner coil in a so-called "one-shot" process is becoming increasingly difficult. That is especially the case because it is imperative to avoid inclusions of air and to obtain an even distribution of the moulding compound. A multi-stage procedure firstly has the advantage that very small spacings between the inner and outer coils can be achieved whilst providing a high degree of freedom of design, for example in the wire diameter or in the type and position of the windings. Secondly, the thermoplastic coil formers that are customary today can be replaced by the moulding compound according to the invention, bringing about a reduction in transitions between dielectrics and, therefore, in potential partial discharges.

What is claimed is:

1. A composition comprising
   (a) an epoxy resin having, on average, more than one 1,2-epoxy group per molecule,
   (b) a polyol as epoxy resin curing agent and
   (c) a solid reaction product of a carboxylic-acid-group-containing microgel and a nitrogen-containing base (microgel-amine adduct) as accelerator.

2. A composition according to claim 1, comprising, as epoxy resin (a), an aromatic epoxy resin.

3. A composition according to claim 1, comprising, as epoxy resin (a), a bisphenol diglycidyl ether or an epoxy novolak.

4. A composition according to claim 1, comprising, as epoxy resin (a), an epoxy phenol novolak or an epoxy cresol novolak.

5. A composition according to claim 1, comprising, as epoxy resin curing agent (b), a cresol novolak.

6. A composition according to claim 1, comprising, as solid microgel-amine adduct (c), a copolymer of at least one unsaturated carboxylic acid and at least one polyfunctional crosslinking agent.

7. A composition according to claim 1, comprising, as additional component (d), a filler.

8. A composition according to claim 1, comprising, as additional component (d), from 1 to 80% by weight filler, based on the total composition consisting of components (a), (b), (c) and (d).

9. A composition according to claim 1, comprising, as component (d), from 1 to 80% by weight wollastonite, based on the total composition consisting of components (a), (b), (c) and (d), having an average particle size of less than 50 $\mu$m.

10. A composition according to claim 1, comprising, as additional component (d), from 25 to 40% by weight wollastonite, based on the total composition consisting of components (a), (b), (c) and (d), having an average particle size of less than 5 $\mu$m.

11. A composition according to claim 1, comprising, as additional component (d), from 1 to 80% by weight quartz/kaolinite mixture, based on the total composition consisting of components (a), (b), (c) and (d), having an average particle size of less than 50 $\mu$m and a ratio by weight of quartz to kaolinite of from 5:95 to 95:5.

12. A composition according to claim 1, comprising, as additional component (d), from 25 to 40% by weight quartz/kaolinite mixture having an average particle size of less than 5 $\mu$m and a ratio by weight of quartz to kaolinite of from 20:80 to 80:20.

13. A crosslinked product obtainable by curing a composition according to any one of claims 1 to 12.

14. The composition of claim 1, wherein the epoxy resin is a solid resin.

15. The composition of claim 14, wherein the solid epoxy resin is an epoxy cresol novolak.

* * * * *